United States Patent [19]

Gamonal

[11] Patent Number: 4,983,005
[45] Date of Patent: Jan. 8, 1991

[54] OPTOELECTRONIC INTEGRATED SEMICONDUCTOR DEVICE INCLUDING A SEPARATOR OF THE TE AND TM POLARIZATIONS

[75] Inventor: Remi Gamonal, Brunoy, France
[73] Assignee: U.S. Philips Corp., New York, N.Y.
[21] Appl. No.: 373,378
[22] Filed: Jun. 28, 1989

[30] Foreign Application Priority Data

Jul. 5, 1988 [FR] France .................. 88 09084

[51] Int. Cl.$^5$ .............................................. G02B 6/10
[52] U.S. Cl. ............................ 350/96.12; 350/96.15; 350/96.29
[58] Field of Search ............... 350/96.12, 96.15, 96.29, 350/96.34

[56] References Cited

U.S. PATENT DOCUMENTS 4,775,206 10/1988 Erman et al. ................ 350/96.12 X
4,787,690 11/1988 Maerz .............................. 350/96.12

OTHER PUBLICATIONS

"LiNbO3 Coupled-Waveguided TE/TM Mode Splitter", by Osamu Mikami in Applied Phys. Lett. 36 (7), Apr. 1, 1980.
"Guided-Wave Polarization Splitter Based on Two-Mode Interference", by A. Neyer, D. Dang in IG-WO-88, Conference ME3-1, pp. 107-110.

*Primary Examiner*—John D. Lee
*Assistant Examiner*—Phan T. Heartney
*Attorney, Agent, or Firm*—William L. Botjer

[57] ABSTRACT

An optoelectronic integrated semiconductor device including a separator of the polarizations TE and TM, this separator comprising two parallel and monomode optical guides $G_1$ and $G_2$, one of which receives at the input a luminous signal, and comprising means for carrying out the separation of this signal and its two components TE and TM, one of which TE is transported to the output through one of the guides and the other component TM is transported to the output through the other guide, characterized in that:

the guides are formed by at least a heterostructure $S/C_1$ and by two parallel erected guiding ribbons R at the surface, and the means for carrying out the separation of the components TE and TM consist of a matallic layer extending between the guiding ribbons at the surface of the structure over a length D, whose value is connected with the coupling length of the component TE by the relation

$$D = L_c(TE),$$

the parameters of the physical quantities of the device being chosen so that the relation $$L_c(TE) = 2L_c(TM),$$

is satisfied

14 Claims, 6 Drawing Sheets

OPTOELECTRONIC INTEGRATED SEMICONDUCTOR DEVICE INCLUDING A SEPARATOR OF THE TE AND TM POLARIZATIONS

BACKGROUND OF THE INVENTION

The invention relates to an optoelectronic integrated semiconductor device including a separator of the TE and TM polarizations, this separator comprising two parallel and monomode optical guides, one of which receives at the input a luminous signal, comprising means for carrying out the separation of this signal in its two TE and TM components, one of which (TE) is transported to the output through one of the guides and the other (TM) is transported to the output through the other guide.

The invention is used inter alia in the manufacture of devices intended for use in homodyne or heterodyne detection.

Especially, the homodyne detection has for its object to mix a signal with a signal of a local oscillator of given frequency to extract therefrom the intermediate frequency. For this purpose, it is indispensable to have available both the TE (Transverse Electric) component and the TM (Transverse Magnetic) component of the signal. In fact, in the homodyne detection, the intensity of the resulting field should be measured, which is expressed by the square value of the sum of the field of the signal and of the field of the local oscillator. In the expression of the intensity of the resulting field the scalar product of the field of the signal and of the field of the local oscillator is employed. It can be seen that, when the vector of the electric field of the signal is orthogonal to the vector of the electric field of the local oscillator, no detection can take place because the information is contained in the scalar product. This explains that it is necessary to decompose both the signal to be treated and the signal of the local oscillator into their two components TE and TM because in these conditions always the case arises in which at least one of the two scalar products then obtained is not zero.

A device for separating the polarizations TE and TM is known from the prior art by the publication entitled "LiNbO$_3$ coupled wave guided TE/TM Mode Splitter" by Osamu Mikami in "Applied Phys. Lett. 36 (7), 1 Apr. 1980, 1980 American Institute of Physics, pp. 491–492.

This device comprises two parallel guides completely buried in a substrate of lithium niobate and formed by local diffusion of titanium (Ti) ions.

At the surface of one of the guides and over a given length $L_1$, designated as coupling length, a metallic layer is formed directly on the said guide. At the surface of the other guide, a second metallic layer is formed over the same length, but in this case a dielectric layer is interposed between this metallic layer and the upper surface of the guide. A potential difference may be applied between the two metallic layers, which then form electrodes.

The operation of this device is based on the following effects:

It is known that, when two guides are arranged parallel over a given length, if one of the guides transports a given mode, this mode will completely pass into the second guide provided that the length over which the two guides are parallel corresponds to the coupling length for the said mode.

This coupling length is associated with the inverse of the difference of the constants of propagation of the symmetrical and antisymmetrical modes, which can propagate in this structure, then forming a coupler.

Now, for each of the polarizations TE and TM, the constants of propagation of the symmetrical and antisymmetrical modes are practically identical, respectively. This results in that, if the TE and TM polarizations should be separated by a coupler constituted by identical guides, this would necessitate an almost inifinite coupling length.

Therefore, the aforementioned document discloses a separator of the TE and TM polarizations based on an asymmetrical structure, in which the coupler is symmetrical for the TE polarization and is asymmetrical for the TM polarization from the viewpoint of the constants of propagation of the TE and TM polarizations for each individual guide. This formation is based on the properties of the TM polarization, which differ from those of the TE polarization. It has been found that, when a metallic layer is directly arranged at the surface of an optical guide, the constant of propagation of the TM polarization is strongly modified by the presence of this metallic layer, while the constant of propagation of the TE polarization is slightly influenced by this presence.

On the other hand, it is known that, in order that two monomode guides are coupled, it is necessary that the constants of propagation of the fundamental mode in each guide are practically identical in the input guide or first guide and in the output guide or second guide, into which the said mode passes by coupling.

When these constants are identical or practically identical for the given mode, there is a total or substantially total transfer in the two guides of this mode from one guide into the other guide. The coupler is considered as symmetrical for the said mode.

When these constants on the contrary are different, the transfer is only partical, even zero, and the coupler is considered as asymmetrical for this mode.

It results from the respective properties of the TE and TM polarizations mentioned above that due to the presence of a metallic layer on the output guide or second guide, the constant of propagation in the guide provided with the metallic layer will become greatly different from the constant of propagation in the first guide not provided with the metallic layer as far as the TM polarization is concerned. On the other hand, the constants of propagation in one and the other guide will remain substantially identical as far as the TE polarization is concerned.

In this case, transfer of the TM polarization from the input guide or first guide to the output guide or second guide will therefore not take place, while the TM polarization will remain in the input guide, in which it will continue to propagate; this transfer can take place for the TE polarization, which will therefore pass into the output guide or second guide or the two parallel guides.

The differences in properties between the TE polarization and the TM polarization in lithium niobate are due inter alia to a physical phenomenon, which appears more particularly in this material. The said phenomenon consists in the appearance of a plasma mode of the TM type, which has an effective propagation index considerably higher than all the remaining indices of the structure and which renders the coupling asymmetrical when the metallic layer is present on the input guide.

In the known device, the second metallic layer is disposed on a dielectric layer in order not to influence the said phenomenon. The metallic layers can thus serve as electrodes in order to adjust the coupling length of the TE polarization to a length desired for the device.

However, if the device described in the aforementioned document has advantages, especially due to the fact that the input and output guides of the TE/TM separator are parallel, on the contrary it has the disadvantage of being formed from lithium niobate, which is not a material permitting of forming optoelectronic circuits in manufacturing synergy with the integrated circuits generally joined thereto.

SUMMARY OF THE INVENTION

Therefore, the present invention has for its object to provide a separator of the TE and TM polarizations, which can be formed and integrated on a III-V material and which is particularly:

miniaturized, in manufacturing synergy with ultrahigh-speed or ultrahigh-frequency integrated circuits, which can be integrated on the same substrate as these circuits, which operates at wavelengths corresponding to the telecommuniation standards, and has minimum losses.

Thus, a III-V material, such as $Ga_xIn_{1-x}AS_yP_{1-y}$, in which x and y are the concentrations, is a material particularly suitable to attain these objects.

However, it has been found that nowadays the phenomenon of the appearance of the plasma mode, which permits of rendering asymmetrical the structure of the TE/TM separator having parallel guides known from the prior art of lithium niobate, cannot be dominated and hence transposed to the III-V materials.

Another separator of polarizations TE and TM is further known from the prior art by the publication entitled "guided-wave polarization splitter based on two-mode interference" by A. Neyer, D. Dang in "IG-WO-88", Conference ME 3-1, pp. 107–110.

This document describes a device, which, as the preceding device, is made of lithium niobate, but which is based on a different physical principle. This separator device comprises a central part constituted by an optical guide having transverse dimensions sufficiently large to be bimode, i.e. to transport both a symmetrical mode and an antisymmetrical mode. This device moreover comprises two monomode input guides, which enclose between them a small angle, and two output guides of the same structure.

The input signal that can be decomposed into TE and TM, is transported in one of the input guides in the central part, in which a first decomposition into the symmetrical and antisymmetrical components of the central guide for each component TE and TM takes place.

Along the central part, interference occurs for each polarization between the symmetrical mode and the antisymmetrical mode. If the length of the central guide is such that it is equal to the coupling length of the TM polarization and that the latter coupling length itself is twice that of the TE polarization, the symmetrical mode and the antisymmetrical mode of the TM polarization at the end of the length of the central guide will be in phase opposition, with respect to the state in which they were present at the input of the central part; this results in that the TM polarization can leave through the guide situated on the side opposite to the input guide with respect to the optical axis of the system. While for the TE polarization, the symmetrical and antisymmetrical modes will be in phase at the end of the central part and the TE polarization will leave through the guide situated on the same side as the input guide with respect to the optical axis.

From this document the teaching can be derived that an operating point can be found as a function of the width of the central part and of the angle between the guides for a coupling length of the TE polarization equal to 0.5 times the coupling length of the TM polarization.

Such a device would be transposable to the III-V materials due to its principle. However, due to its structure it has disadvantages. Especially the angle between the guides is fairly critical. If the angle is small, the evanescent wave corresponding to one of the polarizations intended to be transported through one of the output guides passes into the other output guide and this results in that the separation is imperfect. If the angle is large, the mode conversion for passing from the central region to the output guides is difficult and there are substantial losses. Therefore, in a general manner, due to the fact that the guides enclose between them a critical angle in this known separator system, problems of diaphony and insulation of the two output paths are met.

These problems of structures are avoided and the objects of the invention mentioned above are attained by means of a device of the kind described in the opening paragraph and moreover characterized in that:

the guides are constituted by at least one heterostructure $S/C_1$ and by two parallel erected guiding ribbons R at the surface having a transverse dimension W and a height h spaced apart by an edge-to-edge distance d, and the means for carrying out the separation of the components TE and TM consist of a metallic layer extending between the guiding ribbons at the surface of the structure over a length D, whose value is associated with the coupling length of the composant TE by the relation:

$$D = L_c(TE),$$

the parameters of the physical quantities of the device being chosen so that the relation:

$$L_c(TE) = 2 L_c(TM)$$

is verified.

The device according to the invention especially has the advantage of maintaining the structure of parallel guides and hence of avoiding the formation of critical angles associated with the advantage that it can be manufactured from III-V material by means of a technology of guides having low losses.

BRIEF DESCRIPTION OF THE DRAWING

The invention will be more clearly understood by means of the following description illustrated by the accompanying diagrammatic FIGS., of which:

FIG. 2a shows this device in a sectional view taken on the axis I—I of

FIG. 1a in a first embodiment;

FIG. 2b shows the same device as that of FIG. 2a in a sectional view taken on the axis II—II of FIG. 1a;

FIG. 3b shows the same device as that of FIG. 3a in a sectional view taken on the axis II—II of FIG. 1a;

DETAILED DESCRIPTION OF THE PREFERRED EMBODIMENTS

Figure 1A:
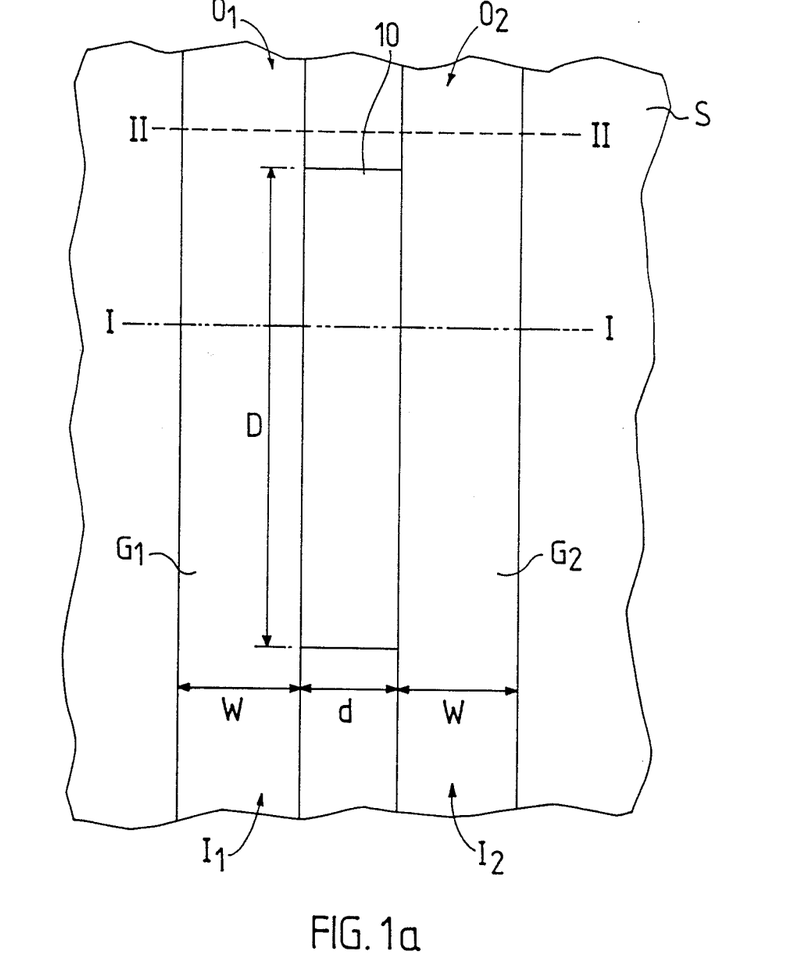
FIG. 1a shows the device for separating the TE and TM polarizations according to the invention, viewed from above.

As shown diagrammatically, viewed from above, in FIG. 1a, the separator of the TE and TM polarizations according to the invention comprises, formed on a substrate S of a III-V material:

two optical parallel guides $G_1$ and $G_2$, respectively, integrated on this substrate S, having a transverse dimension W, spaced apart by an edge-to-edge distance d and made themselves of III—V material, and, arranged between the two optical guides $G_1$ and $G_2$, a metallic layer 10. This layer has a transverse dimension d identical to the distance which separates the guides from edge-to-edge and a longitudinal dimension D, whose value will be defined hereinafter.

The dimensions and characteristics of the guides $G_1$ and $G_2$ are chosen so that they are monomode, that is to say that for a given wavelength they transport the fundamental mode or zero order mode.

A light beam being applied to the input $I_1$ of the guide $G_1$, the object of the invention is to obtain that one of the components TE or TM is available at the output $O_1$ of the guide $G_1$ so that it continues to be transported through this guide $G_1$, and that the other component is then available at the output $O_2$ of the guide $G_2$ so that it continues to be transported through this guide $G_2$, these components TE and TM of the initial signal thus being separated.

The assembly of FIGS. 2 and the assembly of FIGS. 3 each illustrate a method of manufacturing the optical guides integrated on III-V material and apt to constitute a separator of TE and TM polarizations according to the invention.

Figure 2A:
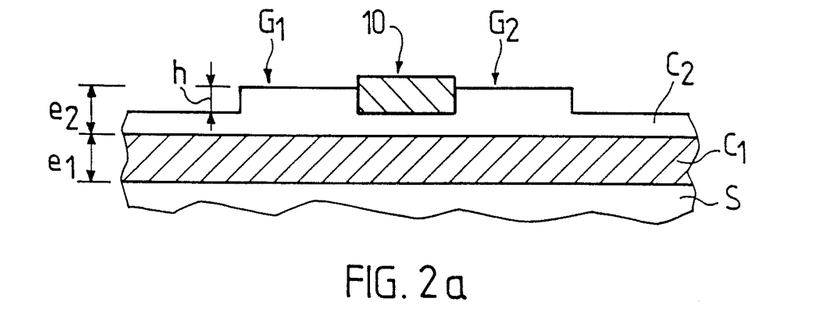
Figure 2B:
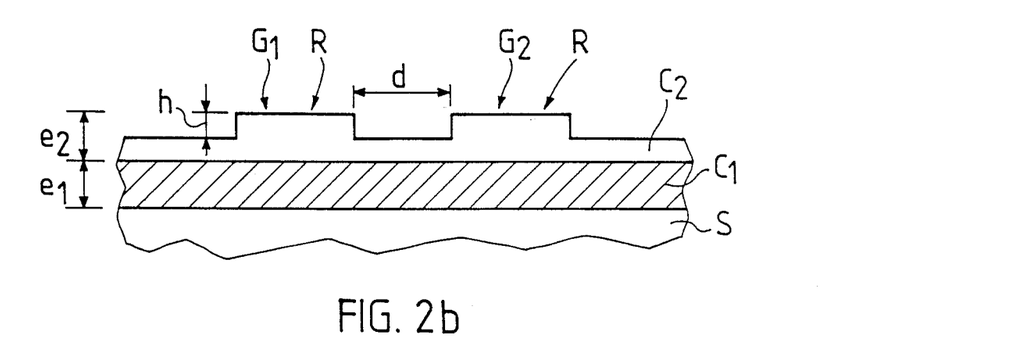
Figure 3A:
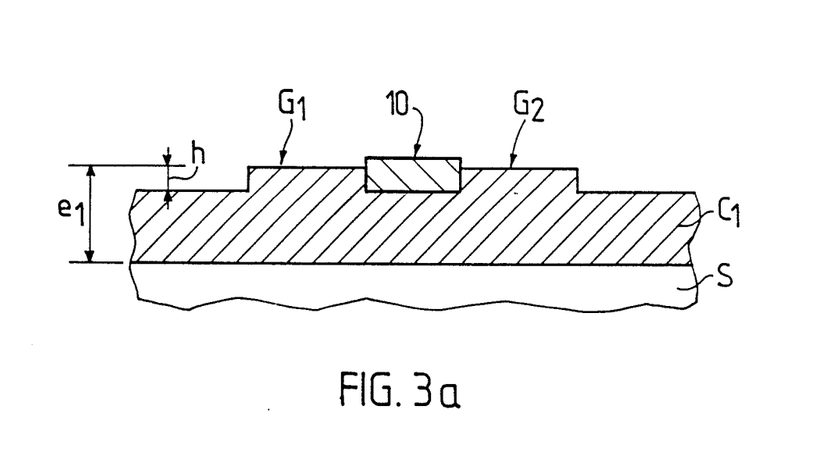
FIG. 3a shows the device according to the invention in a sectional view taken on the axis I—I of FIG. 1a in a second embodiment.
Figure 3B:
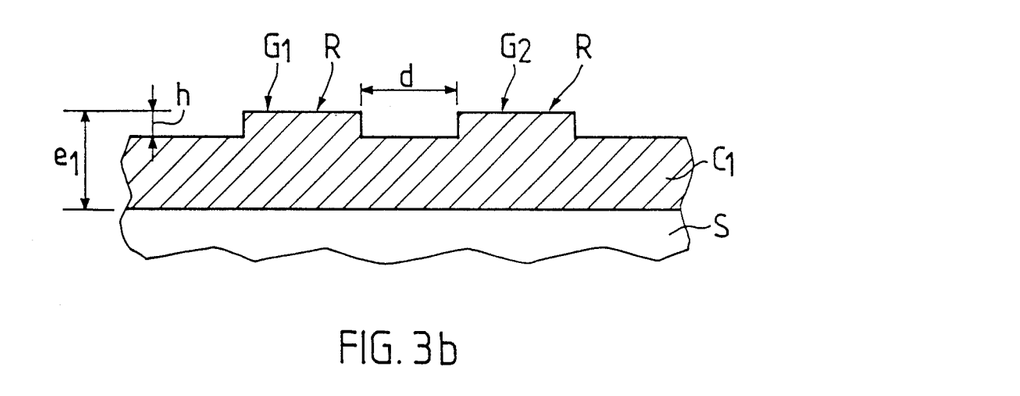

FIGS. 2a and 2b show in a sectional view taken on the axis I—I and the axis II—II of FIG. 1a, respectively, the device according to the invention in the first embodiment. FIGS. 3a and 3b show in a sectional view taken on the axis I—I and the axis II—II of FIG. 1, respectively, the device according to the invention in the second embodiment.

In one and the other of these embodiments, the optical guides are constituted by a guiding layer $C_1$, on which for each guide a ribbon R is disposed, which is of rectangular cross-section and is erected above the device over a small height h with respect to its transverse dimension W.

Figure 2C:
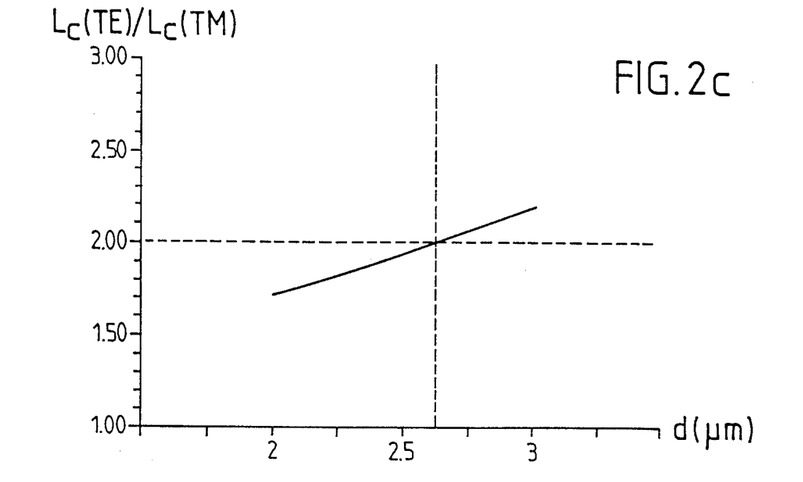
FIG. 2c shows the curve of variation of the ratio of the coupling lengths of the TE and TM polarizations $L_c(TE)/L_c(TM)$ as a function of the edge-to-edge distance d of the guides in this embodiment and for preferred values of the different parameters of the structure.
Figure 2D:
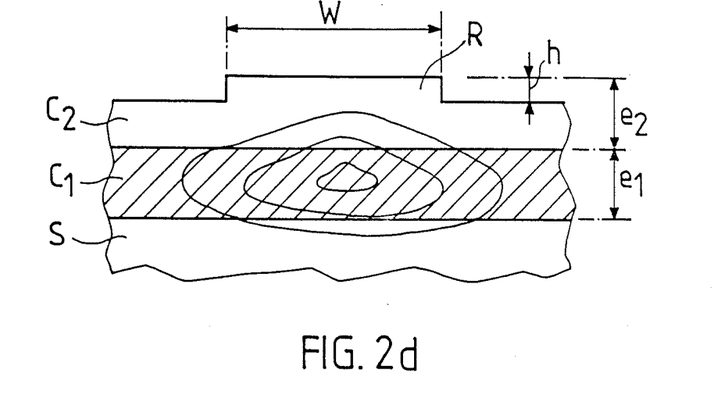
FIG. 2d shows the isoenergy curves in a guide of such a structure.

In the first embodiment shown by the assembly of FIGS. 2a, 2b and 2d in sectional view, the device is constituted by a double heterostructure comprising a binary substrate S, a quaternary guiding layer $C_1$ and a binary confinement layer $C_2$, in which the guiding ribbons R are formed.

Figure 3C:
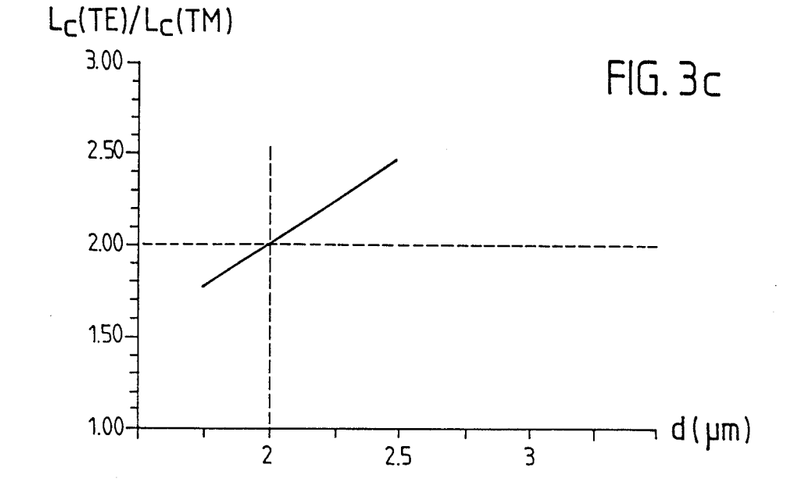
FIG. 3c shows the curve of variation of the ratio of the coupling lengths of the TE and TM polarizations $L_c(TE)/L_c(TM)$ as a function of the edge-to-edge distance d of the guides in this second embodiment.

In the second embodiment illustrated by the assembly of FIGS. 3a, 3b and 3c in sectional view, the device is constituted by a single heterostructure comprising a binary substrate S, a quaternary guiding layer $C_1$, and the guiding ribbons R formed at the surface of this guiding layer.

Figure 3D:
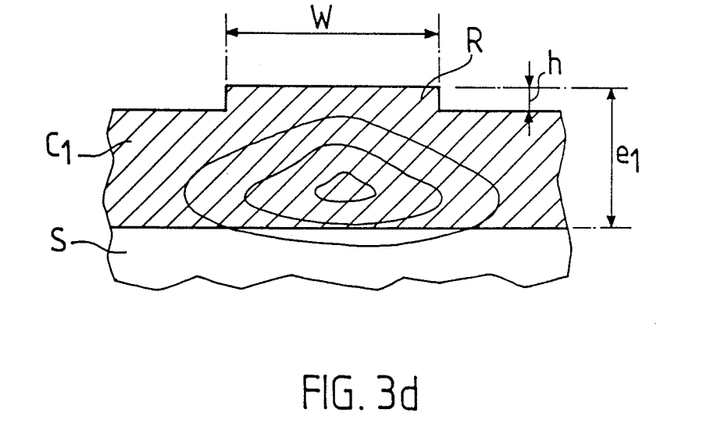
FIG. 3d shows the isoenergy curves in a guide of such a structure.

FIGS. 2e and 3d show, respectively, in a sectional view taken on the axis II—II of FIG. 1a a guide $G_1$ of $G_2$ in one and the other of the two embodiments, as well as the section of the beam symbolically indicated by the isoenergy lines. It can be seen that outside the separation region in each guide the beam mainly propagates in the guiding layer, but that the function of the ribbon R is essential for the guidance.

This type of guide having an upper ribbon is that which nowadays exhibits the lowest losses. However, it should be noted that the double heterostructure system corresponding to the assembly of FIGS. 2 still has lower losses than the single heterostructure system corresponding to the assembly of FIGS. 3.

The device for separating the TE and TM polarizations operates in one and the other embodiments according to the same principle, however.

In one and the other case, the metallic layer 10, which is formed between the guides $G_1$ and $G_2$ in the space between the ribbons R has a complex refractive index, which is a function of the wavelength of the beam and which exerts influence on the effective indices of propagation of the polarizations in the material situated under the metallic layer.

According to the invention, since the TE and TM polarizations cannot be separated, according to the prior art of III-V technology, utilizing the teaching of the first document mentioned as prior art, which teaching is based on the appearance or a plasma mode, and since on the other hand the structure of the second document mentioned should be avoided because of the inherent disadvantages thereof, new properties differentiating the TE and TM polarizations and usable in the III-V technology must be searched.

It appears that due to the fact that the metallic layer is arranged between the guides $G_1$ and $G_2$ in accordance with the invention, the real part of the effective index of propagation of the component TE decreases more strongly than the real part of the effective index of propagation of the component TM.

This property will be utilized to obtain the device according to the invention.

Therefore, it can be seen here that the device according to the invention utilizes a property quite different from the property which was utilized in the first document mentioned, i.e. besides the effect of the plasma mode described already the fact that the metallic layer arranged at the surface of the output guide acted more strongly upon the imaginary part of the effective index of propagation of the TM polarization than upon the imaginary part of the effective index of propagation of the TE polarization. Now, the imaginary part of the effective index of propagation is directly associated with the absorption of the component by the metallic layer. This resulted in that in the known device, the metallic layer acting upon the imaginary part of the effective index of propagation of the TM polarization caused the absorption of this component by the metallic layer. In these conditions, the TM polarization could not propagate in the guide covered by a metallic layer, whereas the TE polarization, which was only very slightly absorbed, could propagate in this guide.

According to the invention, therefore the real parts and not the imaginary parts are acted upon, and in this case, in contrast with the prior art, the TE polarization is most strongly influenced.

The effect on each of the polarizations, taking into account that this effect is stronger on TE, depends:
  upon the structure (single or double heterostructure);
  upon the thickness of the guiding layer $C_1$,
  upon the thickness of the confinement layer $C_2$ when it exists (case of the double heterostructure);
  upon the transverse dimension W of the ribbon R of the guides $G_1$ and $G_2$;
  upon the edge-to-edge distance d of the guides or transverse dimension of the metallic layer;
  upon the height h of the ribbon R;
  upon the complex index of the metallic layer 10.

The coupling lengths $L_c$ of each of the polarizations TE or TM are associated with the constants of propagation $\beta_S$ and $\beta_A$ for the symmetrical and antisymmetrical modes of each of these polarizations TE, TM by the relations 1 and 2 of Table I.

For the determination of these constants of propagation $\beta$ by calculation as a function of the operating wavelength $\lambda_o$ and of the refractive index profile of the structure considered, it is recommendable to read the book entitled "Topics in Applied Physics, Vol. 7, Integrated Optics, Chapter: Theory of Dielectric Wave Guides (H. Wagelnik)", T. Tamir, Editor.

These different parameters will lead to the fact that each of the components Te, TM of a signal applied to the input $I_1$ of the guide $G_1$, for example, will pass into the other guide $G_2$ at the end of the different coupling lengths $L_c$ (TM) for the component TM and $L_c$(TE) for the component (TE).

As stated above, the real part of the constant of propagation of the polarization TE is more strongly influenced than that of TM; this result can further be applied to the symmetrical and antisymmetrical modes in the coupling region.

According to the invention, there can be obtained:

$$L_c(TE) = 2L_c(TM),$$

by preferably influencing the coupling length TE rather than that of TM because the coupling lengths in such a structure of parallel guides (directional coupler) directly depend upon the inverse of the differences of the real parts of the constants of propagation of the symmetrical and antisymmetrical modes.

By fixing the different parameters in order to obtain that the relation $L_c(TE) = 2 L_c(TM)$ is taken into account, it is achieved that in the structure according to the invention, at the end of the length $L_c(TM)$, the component TM is entirely passed into the guide $G_2$, while the component TE is passed only partially into the guide $G_2$.

At the end of the length $2L_c(TM)$, the component TM is returned to the guide $G_1$. The object of the invention is attained and the polarizations TE and TM are separated due to the fact that at this very instant the component TE is entirely passed into the guide $G_2$.

In order to maintain each of the separated polarizations, the end of the metallic layer 10 must coincide with the coupling length $L_c$(TE) in such a manner that $$D = L_c(TE) = 2L_c(TM).$$

Figure 1B:
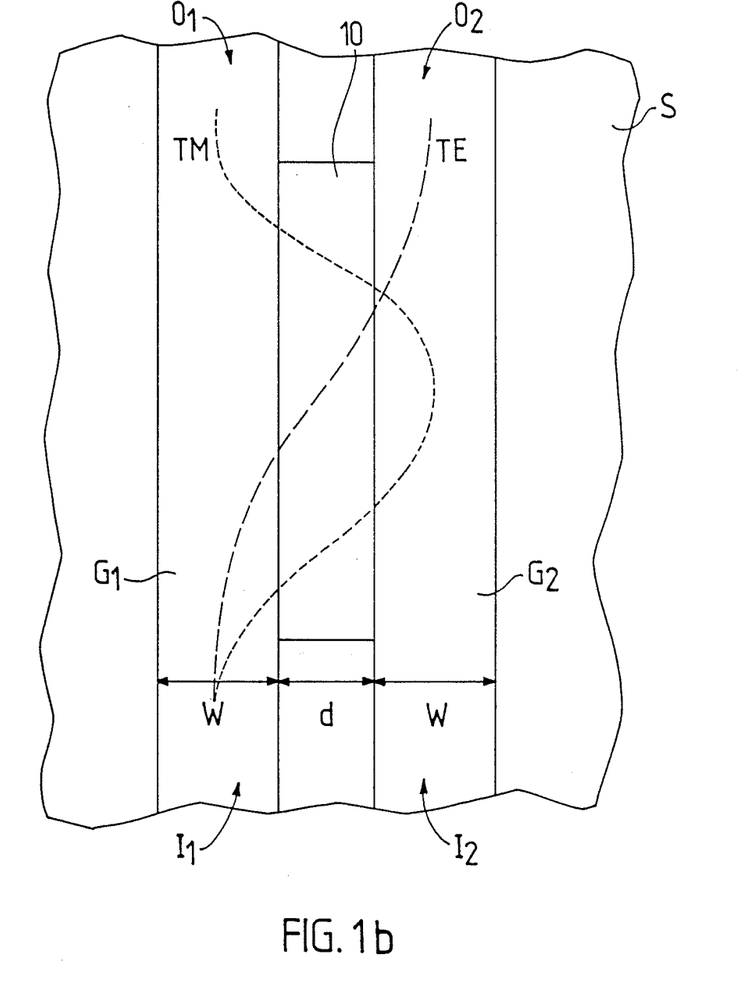
FIG. 1b shows symbolically the path of the beams associated with these polarizations in the same device.

The propagation of the polarizations TE and TM is then effected as shown symbolically in FIG. 1b.

Embodiments of the two types of structures (single heterostructure and double heterostructure) described above will be described hereinafter.

Example I = embodiment of a double heterostructure

In this embodiment illustrated in sectional view in FIGS. 2a and 2b, the device according to the invention first comprises a substrate S of InP, which may be either of the type of resistivity $n^+$ or semi-insulating.

This substrate can be obtained by cutting a wafer from a solid block of InP, the latter being itself formed, for example, by the Czochralski method with liquid encapsulation.

This device then comprises a guiding layer $C_1$ having a thickness $e_1$ of a quaternary III-V material, such as $Ga_xIn_{1-x}As_yP_{1-y}$, in which the concentrations x and y are connected by the relations:

$$y = 0.5$$

$$x = 0.435 \, y.$$

The wavelength associated with the forbidden band energy is 1.22 $\mu$m. The device designed according to this embodiment is intended to operate at the wavelength $\lambda_0 = 1.55$ $\mu$m corresponding to the actual telecommunication standards, i.e. sufficiently remote from the critical wavelength.

The device then comprises a binary layer $C_2$ of InP having a thickness $e_2$, in which the ribbons R having a height h of the guides $G_1$ and $G_2$ are formed.

The formation of the layers $C_1$ and $C_2$ on the substrate $S_1$ can be effected by epitaxial growth according to one of the methods designated as MOCVD or CVD. The formtion of the ribbons R can be effected by means of RIE etching from the upper surface of the confinement layer $C_2$ over a depth h.

The quaternary layer $C_1$ is the guiding layer, as shown by the isoenergy lines represented in FIG. 2d. The choice of the thickness $e_1$ of this layer $C_1$ is based on the facts that:
  it is necessary that it is sufficiently thick to permit the propagation of the fundamental mode (order O).
  it is necessary that it is not too thick to avoid the propagation of the higher order modes.

These conditions impose a thickness $e_1$ such that:

$$0.15 \, \mu m < e_1 < 0.6 \, \mu m.$$

However, the larger $e_1$, the larger is the evanescent part of the wave propagating in the guiding layer. Moreover, if the thickness $e_1$ is substantial, the influence of the metallic layer on the component TM decreases.

These observations have led to the consideration that the thickness $e_1$ of the layer $C_1$ is optimal when:

$$e_1 \approx 0.25 \, \mu m.$$

Likewise, in order to minimize the losses with respect to the component TM, whilst ensuring a sufficient effect on this component, the thickness $e_1-h$, which is the distance between the guiding layer and the metallic layer 10, has to be considered to be optimal when:

$$e_2 - h \simeq 0.15 \ \mu m.$$

It appears from the foregoing that all the parameters of the separation structure of the polarizations TE and TM has exerted influence on the determination of the coupling lengths $L_c(TE)$ and $L_c(TM)$, which is the reason why all these optimized parameters have been brought together in Table II on line A.

In these conditions, the curve of FIG. 2c, which indicates the ratio of the coupling lengths $L_c(TE)$ to $L_c(TM)$, indicates that the condition required:

$$L_c(TE) = 2L_c(TM)$$

is satisfied for an edge-to-edge distance of the guides $$d \simeq 2.65 \ \mu m.$$

i.e. $2.5 \ \mu m < d < 2.75 \ \mu m$.
The coupling length for the component TE $$L_c(TE) \simeq 3600 \ \mu m.$$

The coupling length for the component TM $$L_c(TM) \simeq 1800 \ \mu m.$$

This leads to adopting a length D of the metallic layer formed on the device:

$$D = L_c(TE) = 3600 \ \mu m.$$

These results have been obtained by choosing for the formation of a metallic layer a layer of gold deposited, for example, by evaporation in vacuo. This gold layer will preferably have a thickness of 0.2 to 0.3 $\mu m$.

Gold has a complex index, which is written as:

$$n_m = 0.14 + i \times 8.52$$

at the wavelength of 1.55 $\mu m$, which is the operating wavelength $\lambda_0$. Other metals may be used if they have a real part of the index which is not too large.

In order to show that the performances of the device depending upon the different parameters mentioned can be optimized only if these parameters are also optimized, the line B of Table II indicates the coupling lengths $L_c(TE)$ and $L_c(TM)$ satisfying the condition $L_c(TE) = 2L_c(TM)$ in the case in which the guiding layer $C_1$ is rendered thicker ($e_1 \simeq 0.4 \ \mu m$) and the confinement layer is rendered thinner ($e_2 \simeq 0.1 \simeq h$). It has been found that in these conditions the dimensions of the device are strongly increased because D must attain $$D \simeq 15000 \ \mu m.$$

Example II = embodiment of a single heterostructure

In this example, the substrate S and the layer $C_1$ can be formed exactly with the same technology and the same materials as in Example I.

The confinement layer $C_2$ does not exist ($e_2 - 0$) and the ribbons R are etched, for example by RIE, directly into the quaternary layer $C_1$. FIG. 3d shows the isoenergy lines in a guide having such a structure.

The line C of Tble II indicates the coupling lengths $L_c(TE)$ and $L_c(TM)$ as a function of the different optimized parameters to satisfy the imposed condition between the coupling lengths.

The curve of FIG. 3e shows that the condition is fulfilled for $d \simeq 2.45 \ \mu m$, i.e.

$$2.25 \ \mu m < d < 2.5.$$

This results in that D must be chosen so that:

$$D \simeq 9800 \ \mu m \simeq L_c(TE)$$

with $$L_c(TM) \simeq 4900 \ Um.$$

The choice of the embodiment of one or the other of these examples, whilst considering that the optimum conditions in each case have already been chosen, will therefore be based on the observations that:

the double heterostructure is complexer in construction, but it has the advantages of a smaller dimension (3600 $\mu m$ compared to 9800 $\mu m$), i.e. is more readily integrable and has much lower losses.

The single heterostructure has a simpler construction; it does not exhibit a critical thickness to be formed by epitaxy, but on the other hand its dimensions are larger, it can be less readily integrated and the losses are higher.

A method of manufacturing for growing layers and etching layers of III-V material can be derived, for example, from French Patent Applications filed under Nos. 88 8503 and 88 8504.

TABLE I

| | |
|---|---|
| $L_c(TE) = \pi / (\beta_S - \beta_A)$    TE   TE | (1) |
| $L_c(TM) = \pi / (\beta_S - \beta_A)$    TM   TM | (2) |

TABLE II

| y (μm) | $e_2$ (μm) | h (μm) | $e_1$ (μm) | W (μm) | d (μm) | $L_c$(TE) (μm) | $L_c$(TM) (μm) | $\frac{L_c(TE)}{L_c(TE)}$ | |
|---|---|---|---|---|---|---|---|---|---|
| 0.5 | 0.25 | 0.10 | 0.25 | 3 | 2.65 | 3600 | 1800 | 2 | A |
| 0.5 | 0.1 | 0.1 | 0.4 | 3 | 2.45 | 15000 | 7500 | 2 | B |
| 0.5 | 0 | 0.1 | 0.5 | 3 | 2 | 9800 | 4900 | 2 | C |

I claim:

1. An optoelectronic integrated semiconductor device including a separator of the polarization TE and TM, this separator comprising two parallel and monomode optical guides $G_1$ and $G_2$, one of which receives at the input a luminous signal, and comprising means for carrying out the separation of this signal and these two components TE and TM, one component of which TE is transported to the output through one of the guides, while the other component TM is transported to the output through the other guide, characterized in that:

the guides are constituted by at least a heterostructure $S/C_1$ and by two parallel erected guiding ribbons R at the surface, said guiding ribbons being formed in a common layer structure including at least one heterostructure and the means for carrying out the separation of the components Te and TM consist of a metallic layer extending between the guiding ribbons R at the surface of the structure over a length $D_1$ whose value is correlated with the coupling length of the component TE $L_c(TE)$ by the relation $$D = L_c(TE),$$

the parameters of the physical quantities of the device being chosen so that the relation:

$$L_c(TE) = 2L_c(TM),$$

is satisfied, $L_c(TM)$ being the coupling length of the component TM.

2. A device as claimed in claim 1, characterized in that the guides are constituted by a double heterostructure $S/C_1/C_2$.

3. A device as claimed in claim 2, characterized in that the heterostructure(s) comprise(s) a quaternary layer of a III-V compound to form the guiding layer $C_1$ having a thickness $e_1$ and (a) binary layer(s) of a III-V compound to form the confinement layer(s)

4. A device as claimed in claim 3, characterized in that the quaternary compound has the general formula $Ga_xIn_{1-x}P_{1-y}$, in which x and y are concentrations, and in that the binary compound is InP.

5. A device as claimed in claim 4, characterized in that the concentration $y = 0.5$ and $x = 0.435\ y$.

6. A device as claimed in claim 5, characterized in that the metallic layer is a layer of gold (Au) having a thickness $e_m$.

7. A device as claimed in claim 5, characterized in that in the single heterostructure the height h of the ribbons (R) has a small value with respect to that of the thickness of the quaternary layer $C_1$, in which these ribbons are formed.

8. A device as claimed in claim 7, characterized in that, in order to obtain that the condition $$D = L_c(TE) = 2L_c(TM)$$

is satisfied, at the operating wavelength $$\lambda_0 = 1.55\ \mu m,$$

the parameters of the structure satisfy the following data:

| | |
|---|---|
| $e_1 = 0.50\ \mu m$ | $h = 0.1\ \mu m$ |
| $e_2 = 0$ | $W = 3\ \mu m$ |
| $2.25\ \mu m < d < 2.5\ \mu m$ | $D \simeq 2800\ \mu m$ |
| $e_m$ 0.2 to 0.3 $\mu m$ | |

W being the transverse dimension and d being the edge-to-edge distance of the two ribbons (R).

9. A device as claimed in claim 5, characterized in that in the double heterostructure the upper confinement layer ($C_2$) of binary material has a thickness $e_2$ approximately equivalent to the thickness $e_1$ of the guiding layer $C_1$ of quaternary material, in that the height h of the ribbons (R) formed in the upper confinement layer $C_2$ is smaller than half the thickness $e_2$ of this confinement layer $C_2$.

10. A device as claimed in claim 9, characterized in that, in order to obtain that the condition:

$$D = L_c(TE) = 2L_c(TM),$$

is satisfied, at the operating wavelength $$\lambda_0 = 1.55\ \mu m,$$

the parameters of the structure satisfy the following data:

| | |
|---|---|
| $e_1 = 0.25\ \mu m$ | $h = 0.1\ \mu m$ |
| $e_2 = 0.25\ \mu m$ | $W = 3\ \mu m$ |
| $2.5\ \mu m < d < 2.75\ \mu m$ | $D \simeq 3600\ \mu m$ |
| $e_m \simeq 0.2$ to $0.3\ \mu m$ | |

W being the transverse dimension and d being the edge-to-edge distance of the two ribbons R.

11. A method of manufacturing an optoelectric integrated semiconductor device comprising at least the following steps:

(a) forming a substrate (S) of indium phosphide InP, which is semi-insulating or of the $n^+$-conductivity type, in the form of a wafer obtained by cutting from a solid block of InP, which itself is obtained by drawing by the Czochralski method with liquid encapsulation;

(b) forming a layer $C_1$ having the formula $Ga_xIn_{1-x}As_yP_{1-y}$, in which x and y are concentration, such that $y = 0.5$ and $x = 0.435\ y$, by a method of epitaxial growth over a thickness $e_1$;

(c) etching the upper epitaxial layer in order to obtain a relief on the latter, two ribbons R having a transverse dimension W, extending parallel and separated by an edge-to-edge distance d and having a height h; and (d) depositing a layer of gold (AU) arranged between the ribbons R over a length d and a thickness $e_m$.

12. A method as claimed in claim 11, characterized in that, the epitaxial layer $C_1$ has the thickness $$e_1 = 0.5\ \mu m,$$

in that the ribbons are etched in the latter layer over a depth $h = 0.1\ \mu m$ and in such a manner that:

$$W = 3\ \mu m\ \ 2.25\ \mu m < d < 2.5\ \mu m,$$

and in that the layer of gold has the length $$D \simeq 9800\ \mu m$$

and the thickness $$e_m \simeq 0.2\ \text{to}\ 0.3\ \mu m.$$

13. A method as claimed in claim 11, characterized in that it comprises between the steps (b) and (c) the following step:

(b) forming a layer $C_2$ having the formula InP by a method of epitaxial growth, for example of the MOCVD or the CVD type.

14. A method as claimed in claim 13, characterized in that, the epitaxial layer $C_1$ has the thickness $e_1 = 0.25$ μm, the epitaxial layer $C_2$ has the thickness $e_2 = 0.25$ μm, and ribbons (R) are etched in the latter layer over a depth $h \approx 0.1$ μm and in such a manner that:

$W = 3$ μm, $2.5$ μm $< d < 2.75$ μm, and in that the layer of gold has the length $d \approx 3600$ μm and the thickness $e_m \approx 0.2$ to $0.3$ μm.

* * * * *